Patented Mar. 24, 1936

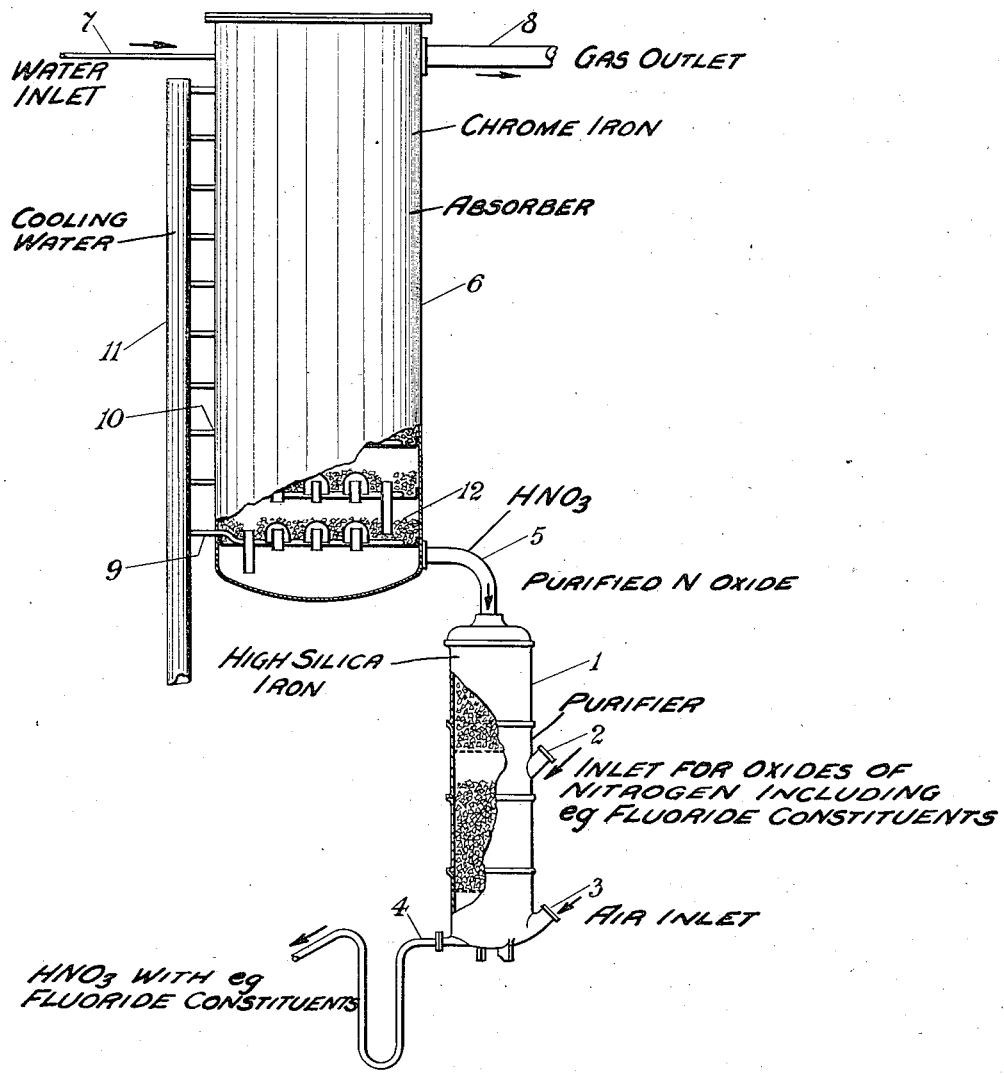

2,034,863

UNITED STATES PATENT OFFICE 2,034,863

ABSORPTION OF OXIDES OF NITROGEN

Stanley L. Handforth, Woodbury, and Albert F. Kozak, Elizabeth, N. J., assignors to E. I. du Pont de Nemours & Company, Wilmington, Del., a corporation of Delaware Application February 24, 1933, Serial No. 658,374

2 Claims. (Cl. 23—159)

This invention relates to a method and apparatus for the absorption of oxides of nitrogen from gases containing the same, and more particularly to a method and apparatus for recovering these oxides when they carry with them certain corrosive substances.

In the nitration of many products "spent" or "waste" acids result which contain both nitric and sulfuric acids. In order to recover these in usable form it is necessary that all the nitric acid be removed from the sulfuric. This is accomplished by distilling off the nitric acid. However, since the spent acids also contain appreciable quantities of organic matter and nitroso sulfuric acid, large amounts of oxides of nitrogen are liberated, which are not recovered in the ordinary condenser for the nitric acid. In order to recover these gases as nitric acid they must be further oxidized and absorbed in water. This has been accomplished heretofore by passing these gases along with sufficient air to oxidize them up thru a series of chemical ware absorption towers countercurrent to the absorbing acids. Large space and considerable pumping of acid is required in this method and in order to overcome this an effort was made to accomplish this oxidation and absorption in one large diameter packed type absorption tower. This effort was not entirely successful, however, because the gases did not come into contact with sufficient liquid to be absorbed. In addition, a large amount of heat was developed which it was difficult to remove. Bubbler cap type absorption towers have been proposed to overcome the difficulty with the small amount of liquid but these still possess the disadvantage that it has heretofore been difficult to remove the heat of reaction. Another serious disadvantage of this later scheme is that these gases contain substances which corrode the acid resistant alloys particularly the chrome iron alloys, which can be relatively easily worked. While the high silica iron alloys are not corroded they are so difficultly worked that the cost of a bubbler cap type absorption tower made of this material would be excessive.

This invention has as an object the overcoming of these objections by providing a type of absorption system which is simple and which obviates the difficulties of exposing the gases to large amounts of liquid, removing the heat of reaction, and providing an apparatus which is at the same time inexpensive and not subject to corrosion. Other objects will appear hereinafter.

These objects are accomplished by the following invention. We have found that the components of the gases, which corrode the chrome iron alloys may be removed by scrubbing the gases with the acid formed in the process or, in other words, that by passing the gases through a simple packed type tower made of a silica iron alloy first, down which the acids formed in the process flow, they may then be passed through a bubbler cap type tower made of the more easily workable chrome iron alloys without causing these latter towers to corrode. We have also found that the heat of reaction may be most efficiently removed by means of coils placed in the acid around the bubbler caps through which coils cooling water or other cooling means is passed. An extremely high rate of heat transfer is obtained by this means, and therefore a minimum of cooling surface is necessary.

We have further found that by placing deflecting means on the tray and surrounding the bubbler caps to sufficient depth to rise above the liquid, the gas bubbles are broken up so that better scrubbing and more efficient absorption are obtained. This deflecting material may be fins or grids or such packing materials as crushed quartz, chemical-ware rings or metallic spirals.

Sufficient space must, however, be left between the top of this deflecting material and the botton of the tray next above to permit oxidation of considerable quantity of NO to $NO_2$, if the apparatus is to work efficiently, since the absorption of $NO_2$ in water to form nitric acid produces NO. This reaction is very slow but it is important because NO is not absorbed as nitric acid until it has been oxidized to $NO_2$. It is also desirable to remove from the acid formed the dissolved oxides of nitrogen in order to oxidize them and cause them to be absorbed as nitric acid. This can be accomplished by introducing the gases containing the oxides of nitrogen a short distance above the bottom of the tower and introducing air at the bottom of the tower which bubbling up through the acid, after the acid has passed the inlet for the oxides, removes from the acid whatever oxides are dissolved in it. The oxides and air then join the main stream. In some special cases the lower part of the system may be of the bubbler plate type and the packed section eliminated by constructing the system of the proper corrosion resistant alloys.

One embodiment of this invention is illustrated in the single figure of the drawing. The gases composed mainly of oxides of nitrogen from the denitrating unit enter tower 1 through inlet 2. This tower made of a high silica iron alloy or chemicalware is packed with an inert filling material, such as crushed quartz or chemicalware rings. Chemicalware is of course, ware, such as earthenware of certain types, highly resistant to chemicals, as is well understood by those skilled in the art. Air is admitted through damper 3 passing up through the tower. It serves to remove the oxides of nitrogen dissolved in the acid in the rest of the system and to supply oxygen to oxidize the gases entering through 2. The acid made in the upper part of the system passes down through this tower and scrubs the gases entering through 2, removing the components injurious to the chrome iron alloy, after which it passes out of the system through outlet 4. The gas containing oxygen and oxides of nitrogen but now freed of the corrosive impurities passes out through 5 and enters absorption tower 6 of the bubbler cap type which is constructed of chrome iron alloy resistant to nitric acid. Water is admitted to this tower through 7 and flowing down through it, scrubbing the gases in the counter current manner, supplies the water necessary to convert the oxides of nitrogen to nitric acid and absorb it. The final gases almost free of oxides of nitrogen leave the system at 8. Cooling coils 9 lie in the liquid surrounding the bubbler caps and remove the heat of reaction. The ends of these coils pass out through the wall at 10 and are connected to the header 11 so that no joints are necessary inside the absorption system. This serves to prevent undetected leakage of acid from the system. Deflecting material such as crushed quartz, chemicalware rings or metal grids is placed in the liquid on the trays to deflect the bubbles issuing from under the bubbler caps and to break them up in order to effect better scrubbing of gases and more efficient absorption of the oxides of nitrogen. Sufficient space is left between the top of the deflecting material and the bottom of the tray next above to allow time for substantial oxidation of NO to $NO_2$ to take place.

As an example of the practical advantages of tower 1, or the pre-scrubbing tower, I may cite the removal of the deleterious impurities from nitroglycerin spent acids. When acids of this type are to be denitrated, the presence of silicon tetrafluoride or other fluoride in the acid is considered particularly harmful. As in the case previously cited, acids and uncondensed gas from the nitroglycerin spent acid are introduced into the tower at 2 and the gas containing oxides of nitrogen and oxygen, but freed from the fluoride constituents, enters tower 6 though 5. The extent of the improvement in the corrosive properties is indicated by the following results of corrosion tests with stainless steel.

| Locus of exposure | Rate of corrosion—Inches penetration per month after 65 hours exposure |
| --- | --- |
| Fume line entrance to No. 1 tower | 0.0209 |
| Fume line entrance to No. 6 tower | 0.0000938 |

The above results of tests give decisive evidence of practical value of our invention.

It will be apparent from the foregoing that many different embodiments of this invention exist and may be practiced without departing from the spirit thereof. It is therefore to be understood that we do not intend to be limited to the specific embodiments described, except as indicated in the appended claims.

We claim:

1. The process of recovering oxidizable oxides of nitrogen from gases containing the same but also containing substances corrosive to chrome-iron alloys although substantially non-corrosive to high silica iron alloys or chemicalware, such substances being removable by nitric acid, which process comprises: producing nitric acid, washing said gases with said acid to remove said substances, such washing being performed in a tower made of high silica iron alloys or chemicalware, introducing an oxygen containing gas and contacting the purified gases with water and nitric acid countercurrently, thereby to absorb the purified oxides of nitrogen, forming nitric acid, such absorption being performed in a tower made of chrome-iron alloy.

2. The process of recovering oxidizable oxides of nitrogen from gases containing the same but also containing fluorides, which process comprises: producing nitric acid, washing said gases with said acid to remove said fluorides, such washing being performed in a tower made of high silica iron alloys or chemicalware, introducing an oxygen containing gas and contacting the purified gases with water and nitric acid countercurrently, thereby to absorb the purified oxides of nitrogen, forming nitric acid, such absorption being performed in a tower made of chrome-iron alloy.

STANLEY L. HANDFORTH.
ALBERT F. KOZAK.